(12) United States Patent
Knowles et al.

(10) Patent No.: US 10,147,921 B2
(45) Date of Patent: Dec. 4, 2018

(54) SYSTEM, METHOD, AND APPARATUS FOR BATTERY PROTECTION

(71) Applicant: KULR TECHNOLOGY CORPORATION, Santa Clara, CA (US)

(72) Inventors: Timothy Ray Knowles, San Diego, CA (US); Michael Gerald Carpenter, San Diego, CA (US); Yoshio Robert Yamaki, San Diego, CA (US); Michael Mo, Saratoga, CA (US)

(73) Assignee: KULR Technology Corporation, Campbell ( * ) Notice: Subject to any disclaimer, the term of this patent is extended or adjusted under 35 U.S.C. 154(b) by 247 days.

(21) Appl. No.: 15/203,748

(22) Filed: Jul. 6, 2016

(65) Prior Publication Data

US 2017/0012260 A1    Jan. 12, 2017

Related U.S. Application Data

(60) Provisional application No. 62/189,004, filed on Jul. 6, 2015.

(51) Int. Cl.
| | |
|---|---|
| *H01M 2/10* | (2006.01) |
| *H01M 2/12* | (2006.01) |
| *H01M 2/02* | (2006.01) |
| *H01M 10/0525* | (2010.01) |
| *H01M 10/613* | (2014.01) |
| *H01M 10/6567* | (2014.01) |
| *H01M 10/625* | (2014.01) |
| *H01M 10/643* | (2014.01) |

(52) U.S. Cl.
CPC ....... *H01M 2/1077* (2013.01); *H01M 2/0267* (2013.01); *H01M 10/0525* (2013.01); *H01M 10/613* (2015.04); *H01M 10/6567* (2015.04); *H01M 2220/20* (2013.01); *Y02E 60/122* (2013.01)

(58) Field of Classification Search
CPC ........ H01M 2/10; H01M 2/1077; H01M 2/12; H01M 2/02; H01M 2/024; H01M 10/0525; H01M 10/613; H01M 10/6567; H01M 10/625; H01M 10/643
See application file for complete search history.

(56) References Cited

U.S. PATENT DOCUMENTS

| | | | |
|---|---|---|---|
| 6,261,716 B1† | 7/2001 | Hall | |
| 9,692,096 B2* | 6/2017 | Harris | ............... H01M 10/6557 |
| 2004/0071870 A1* | 4/2004 | Knowles | ............... B82Y 10/00 |
| | | | 427/200 |
| 2015/0280295 A1† | 10/2015 | Bhunia | |
| 2016/0104925 A1† | 4/2016 | Xiang | |

\* cited by examiner
† cited by third party

*Primary Examiner* — Karie O'Neill Apicella
(74) *Attorney, Agent, or Firm* — Venture Pacific Law, PC (57) ABSTRACT

A battery protection system comprises sleeves, carbon fibers, a case, and liquid. The sleeves are hollow for insertion of battery cells. The carbon fibers are disposed on outer surfaces of the sleeves. The case houses the sleeves and has an inner cavity. The liquid and the carbon fibers are disposed in the inner cavity, where the carbon fibers are exposed to the liquid.

19 Claims, 7 Drawing Sheets

SYSTEM, METHOD, AND APPARATUS FOR BATTERY PROTECTION

CROSS REFERENCE

This application claims priority from a provisional patent application entitled "System, Method, and Apparatus for Battery Protection" filed on Jul. 6, 2015 and having application No. 62/189,004. Said application is incorporated herein by reference.

FIELD OF INVENTION

The present disclosure relates to battery protection and, in particular, to a system, method, and apparatus for battery protection to prevent thermal runaway propagation.

BACKGROUND

Lithium-Ion ("Li-Ion") 18650 cells (and other batteries) all have a slight chance of spontaneously shorting which heats the interior gradually to 130 C where the "separator" film melts. That triggers an explosive release of electric energy, where the end cap ruptures, a flare emerges briefly (~1 s), and then for a minute or so the cell materials combust, releasing heat and driving the cell to temperatures T greater than 500 C.

Neighboring cells can be heated above the critical 130 C at which they also short with the same consequences, known as "thermal runaway propagation." The Boeing battery problem is of this nature. Tesla batteries handle this problem with an active cooling system. There is a desire to seek a passive solution suitable for battery modules of arbitrary cell sizes.

Therefore, there exists a need for a new system, method, and apparatus for preventing thermal runaway propagation in a battery system.

SUMMARY OF INVENTION

Briefly, the present disclosure discloses a battery protection system comprising: sleeves, wherein the sleeves are hollow for insertion of battery cells; carbon fibers disposed on outer surfaces of the sleeves; a case, wherein the case houses the sleeves and wherein the case has an inner cavity; and liquid, wherein the liquid is disposed in the inner cavity, and wherein the carbon fibers are exposed to the liquid in the inner cavity.

DESCRIPTION OF THE DRAWINGS

The foregoing and other objects, aspects, and advantages of the present disclosure can be better understood from the following detailed description of the preferred embodiment of the disclosure when taken in conjunction with the accompanying drawings.

DETAILED DESCRIPTION OF THE PREFERRED EMBODIMENTS

Figure 1:
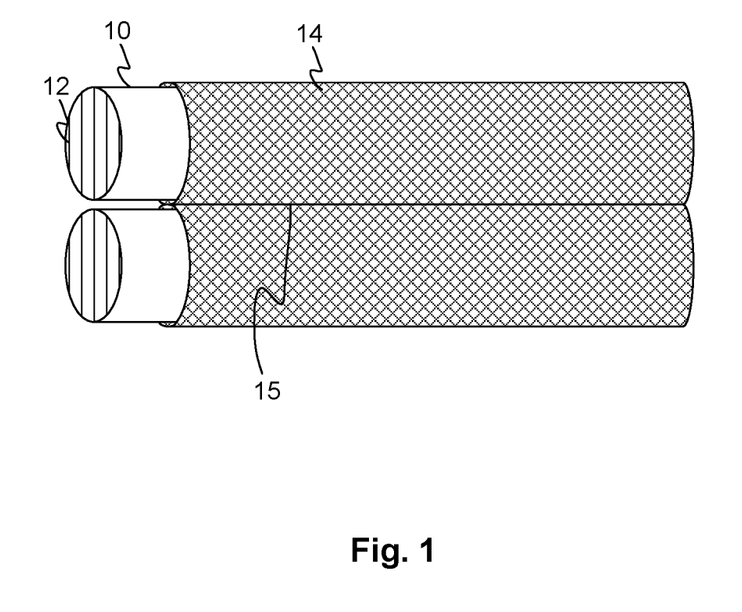
FIG. 1 illustrates sleeves of the present invention interconnected via carbon fibers disposed on the sleeves.

FIG. 1 illustrates sleeves of the present invention interconnected via carbon fibers disposed on the sleeves. Sleeves 10 have carbon fibers 14 disposed on an outer surface of each of the sleeves 10. The sleeves 10 are hollow, and each have an inner surface and an outer surface. Battery cells 12 can be disposed inside the hollow volume of the sleeves 10. Liquid (not shown) can traverse the carbon fibers 14 from one sleeve to another through capillary attraction (or other forces, e.g., gravity, etc.). The carbon fibers 14 can transfer heat energy generated by the battery cells 12 from the sleeves 10 to the liquid via the carbon fibers 14. Due to the transfer of energy, the liquid may undergo a phase transition into a gaseous state, further dissipating the heat energy.

The number of sleeves having carbon fibers can vary depending on the configuration. Each sleeve has carbon fibers disposed on its outer surface. When two or more sleeves are within a length of the carbon fibers, then those sleeves are said to be interconnected since heat energy and liquid can be transferred from the carbon fibers of one of the sleeves to the carbon fibers of the other one of the sleeves. The carbon fibers should be connected to carbon fibers of at least one of the other sleeves. In the instant example of two sleeves interconnected by carbon fibers, an interconnection 15 of the carbon fibers 14 allow for the transport of liquid between the sleeves 10.

Figure 2:
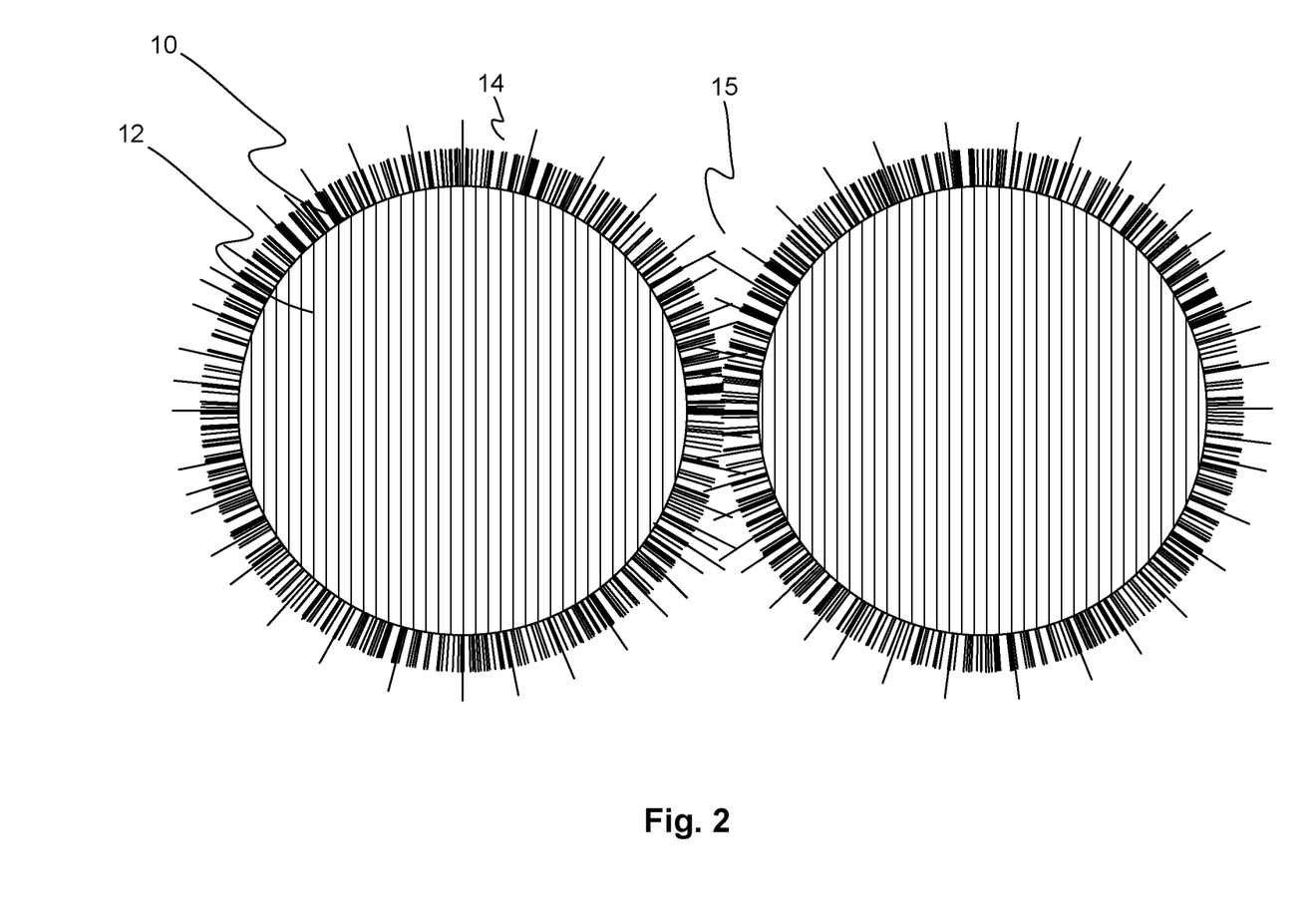
FIG. 2 illustrates a cross-section view of sleeves of the present invention interconnected via carbon fibers.

FIG. 2 illustrates sleeves 10 of the present invention interconnected via carbon fibers 14 disposed on the sleeves 10. The carbon fibers 14 can be wetted via capillary action such that the carbon fibers 14 around the sleeve have liquid on them. In essence, the carbon fibers 14 act as wicks. To increase the wicking ability, the carbon fibers 14 can have at least two different lengths of carbon fibers. Thereby, at least two layers of carbon fibers can be disposed on each sleeve. A first layer comprises shorter and denser carbon fibers that are radially disposed on the sleeves 10. The first layer is a strong wick since it has a smaller pore size. A second layer comprises longer and sparser carbon fibers than the first layer that are radially disposed on the sleeves 10. Due to their length and density, the second layer has a smaller capillary height than the first layer.

At the interconnection 15, there may be some touching between the first layers of the sleeves 10. However, in certain embodiments, it may not be ideal for the shorter carbon fibers of the first layers to substantially interconnect with each other since it may hinder the capillary action. Rather, the longer carbon fibers of the second layers can be interconnected with each other and with the shorter carbon fibers of the adjacent sleeve at the interconnection 15. Since the longer carbon fibers of the second layers have a smaller capillary height, capillary action is greater.

Figure 3:
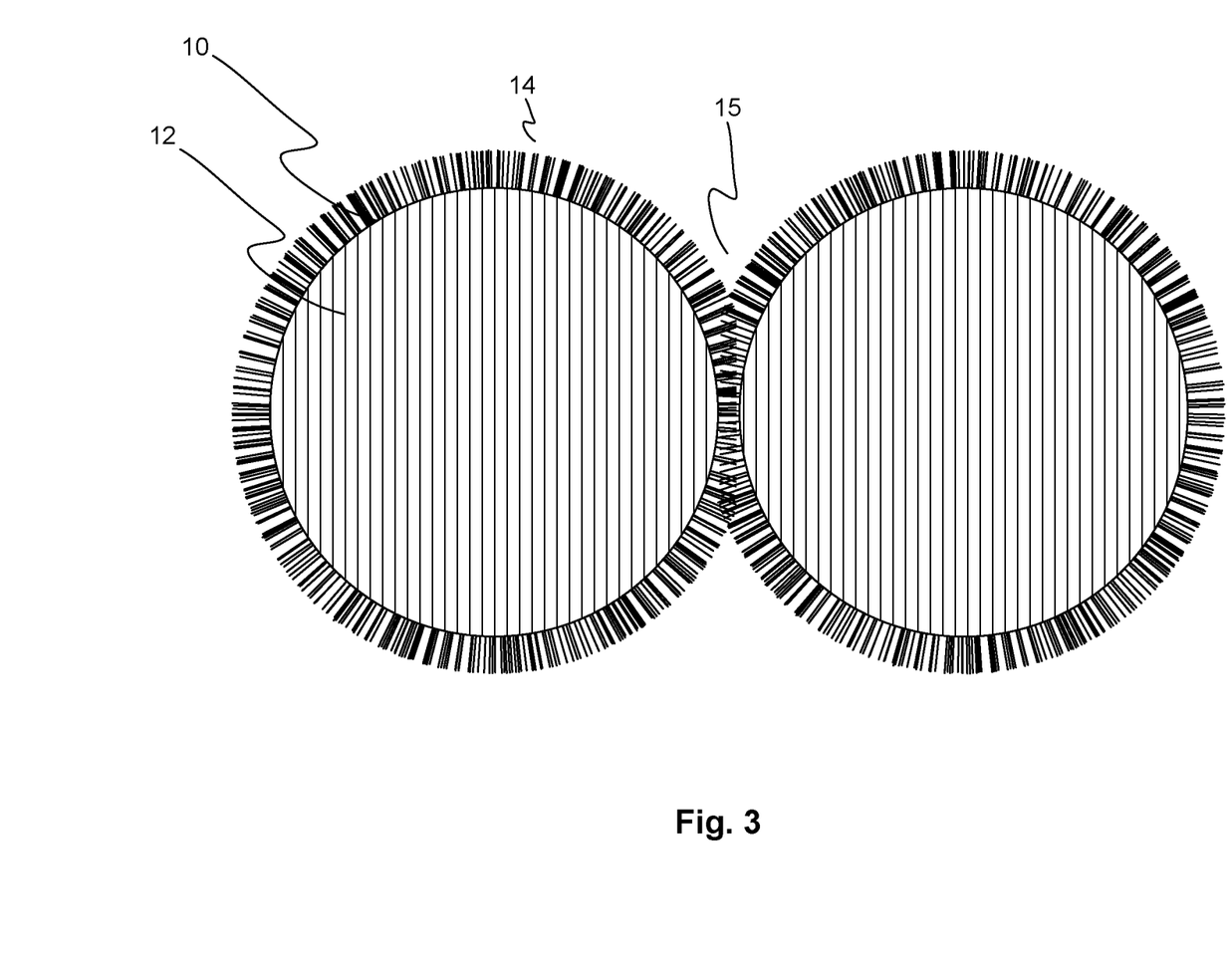
FIG. 3 illustrates a cross-section view of sleeves of another embodiment of the present invention interconnected via carbon fibers.

FIG. 3 illustrates a cross-section view of sleeves of another embodiment of the present invention interconnected via carbon fibers. In this embodiment, a layer of carbon fibers 14 is disposed on the sleeves 10. The carbon fibers can all be around the same length away from the sleeves 10. However, at an interface area 30 (see FIG. 4), the carbon fibers 14 are trimmed back to provide for a flat interface area with one or more adjacent sleeves. Thus, the carbon fibers 14 at the interface area 30 have shorter fibers than elsewhere on the respective layer of carbon fibers 14.

Figure 4:
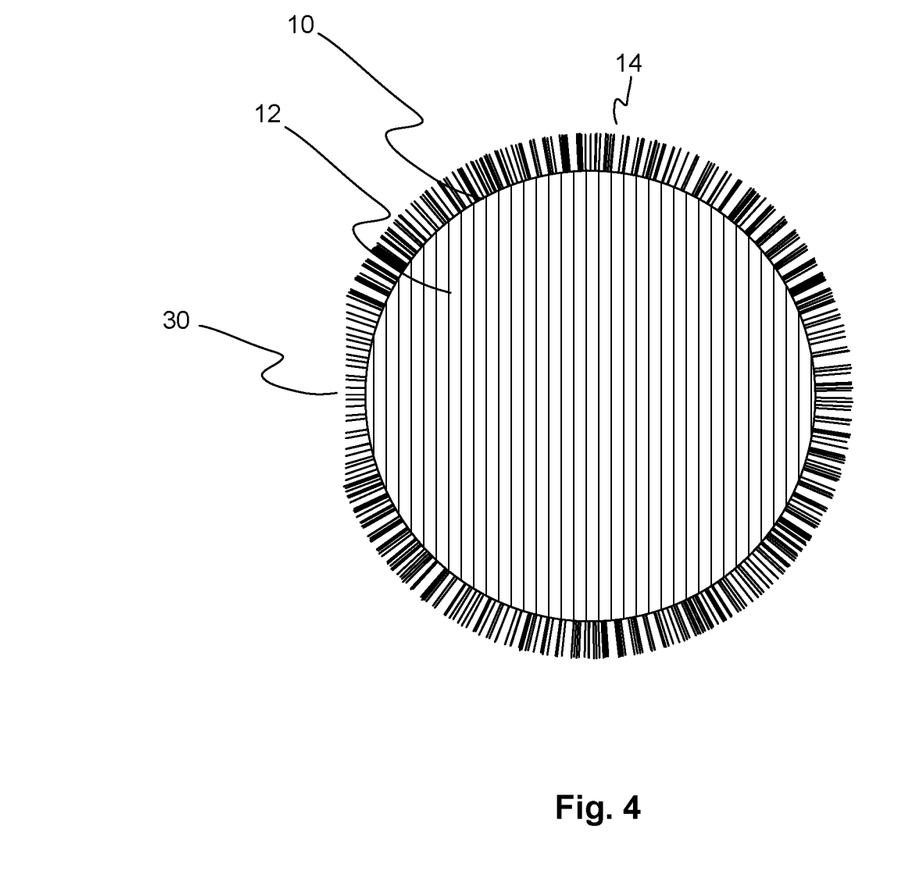
FIG. 4 illustrates a cross-section view of a single sleeve of the present invention having a layer of carbon fibers, where one side of the carbon fibers is trimmed back.

FIG. 4 illustrates a cross-section view of a single sleeve of the present invention having a layer of carbon fibers, where one side of the carbon fibers is trimmed back. A substantially flat interface area 30 of the layer of carbon fibers 14 can be used for interfacing other carbon fibers from other sleeves. The carbon fibers 14 can be originally around the same length from the sleeve 10. One or more certain areas of the carbon fibers 14 can be trimmed to provide the flat interface area 30. Since a sleeve may interface more than one other sleeve, there can be multiple flat interface areas; one for each of those interconnections.

In the previous examples, two sleeves are interconnected via carbon fibers to illustrate a concept of the present disclosure. This configuration is meant only for illustrative purposes and is not meant to limit the present disclosure in any manner. It is understood that a person having ordinary skill in the art can use the present disclosure to extend its concepts to a wide range of sleeve configurations. Therefore, the present disclosure is meant to include all these sleeve configurations.

Figure 5:
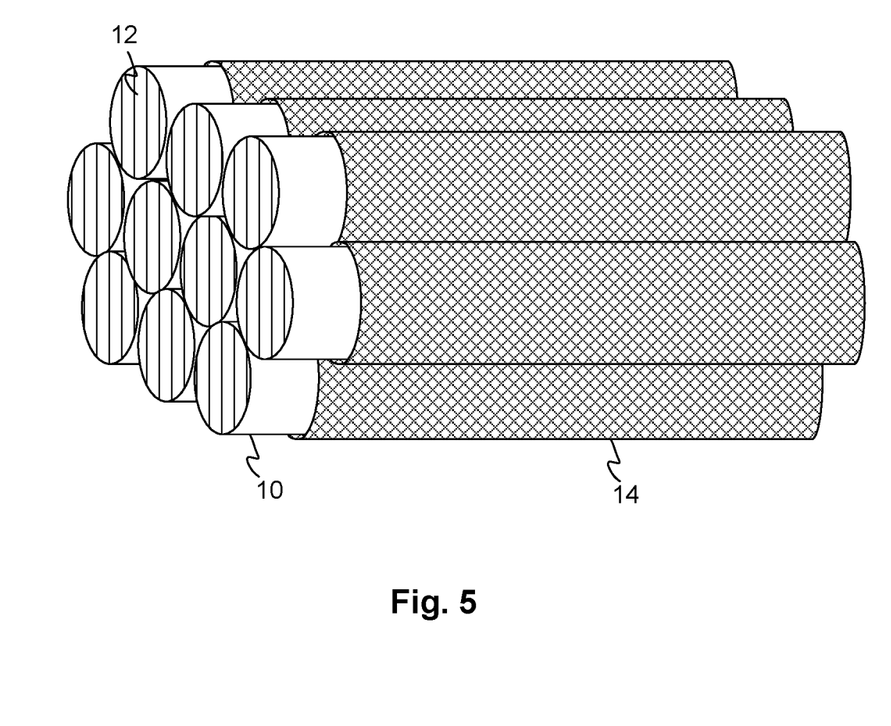
FIG. 5 illustrates sleeves of the present invention arranged in a stacked configuration.

FIG. 5 illustrates sleeves of the present invention arranged in a stacked configuration. In an example of the configuration of sleeves for a battery protection system of the present invention, the sleeves 10 can be arranged in a M×N array of sleeves (in this example there a 3×3 array is shown), where the respective carbon fibers of a sleeve are connected to carbon fibers of adjacent sleeves. In such configuration, the sleeves can have six possible interface areas, one interface area for each of the surrounding sleeves.

Figure 6:
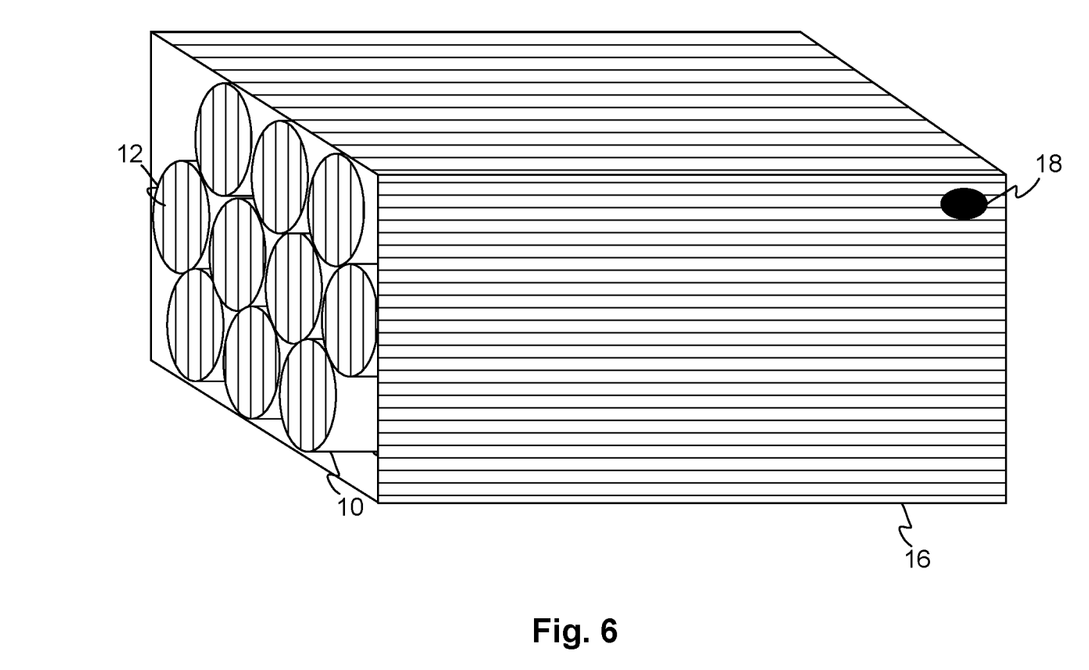
FIG. 6 illustrates a battery protection system of the present invention having sleeves housed in a case.

FIG. 6 illustrates a battery protection system of the present invention having sleeves housed in a case. A battery protection system of the present invention comprises the sleeves 10 for housing battery cells 12, carbon fibers disposed on an outer surface of the sleeves 10 (not shown in this figure, but shown in FIGS. 1-2), a case 16 for housing the sleeves 10, and liquid for wetting the carbon fibers.

The case 16 can be hollow such that after insertion of the sleeves 12, the sleeves 12 are secured to the case 16 by a fixing means, e.g., soldering, glue, mechanical force, etc. In an embodiment of the invention, a side wall (not shown) can have holes in which the sleeves can be placed through to secure the sleeves within an inner hollow cavity. Once the sleeves are disposed through the holes, the inner cavity of the case 16 can be enclosed such that liquid within the inner cavity does not escape to the exterior of the case 16. The case 16 can have a gas release valve 18 to release any gaseous buildup within the inner cavity of the case 16.

As mentioned, the carbon fibers and the liquid are enclosed within the inner cavity of the case 16. The liquid can wet the carbon fibers within the inner cavity without leaking from the case 16. When sufficient heat energy is transferred from one or more of the sleeves to the liquid, a portion (or all) of the liquid can undergo a phase transition from a liquid state to a gaseous state. The gas can be kept within the inner cavity of the case 16. Some or all of the gas vapor may also be released through the gas release valve 18.

The type of liquid in the inner cavity can be selected based on its thermal properties. The liquid can be water, alcohol (e.g., including methanol, ethanol etc.), or other vaporizing liquids (preferably a liquid with a boiling point in the range of 60-110 degrees Celsius). For lithium ion cells, the preferred liquid is water because its boiling point is 100 degrees Celsius, which is below the melting point of the cell separators, e.g., the sleeves. One Li-Ion 18650 cell releases electrical and combustion energy less than 80 kJ. That energy can be absorbed by boiling approximately 30 grams of water. The liquid can then be used to safely transfer that heat energy by changing the state of the liquid into a gaseous state. There can also be additional margins of liquid, e.g., 10 percent extra liquid or enough liquid to replace at least one blown cell, in the inner cavity to prevent running out of liquid or to otherwise increase the life or reusability of the case 16.

For instance, assuming the following: 10 lithium ion battery cells are housed in a battery protection system of the present invention; sleeves of the battery protection system have two layers of carbon fibers; a first layer of carbon fibers is 1 mm in length; a second layer of carbon fibers is 2 mm in length; and water is used as the liquid to wet the carbon fibers, then each of the first layers should store at least 3 grams of water and the second layer of carbon fibers should store at least 30 grams of water. When one of the cells shorts and burns up, the stored water in the associated sleeve to that cell will change state to gas vapor to prevent thermal runaway propagation. The additional water stored in the second layer can then migrate through capillary action to wet the now dry first layer of the associated sleeve. In other embodiments, it may be prudent to provide more water for the second layers to give more margin to the system for additional shorts and burn outs of battery cells. When this example is scaled up to account for additional battery cells, the overall percentage of water to the weight of the battery is reduced since the water stored in the second layer of the carbon fibers can be held constant through that scaling (unless more water is added to increase the margin for the system).

Furthermore, the carbon fibers comprise a first group of fibers having a first predefined length and a second group of fibers having a second predefined length, and where the first predefined length is greater than the second predefined length. The density of the first group of carbon fibers is less than the density of the second carbon fibers. The different lengths can provide a reserve of liquid such that when liquid from the denser and shorter carbon fibers of the second group burn away liquid, the liquid at the longer and less denser carbon fibers of the first group can provide a reserve from which the shorter carbon fibers can tap into due to the capillary attraction, or other forces (e.g., gravity, pressure, etc.). Additionally, since the first group of carbon fibers is less dense, these fibers have less opposition against the capillary action of the liquid than the second group of carbon fibers.

It is important to note that the carbon fiber density and length and the amount of liquid and type of liquid to use in the present disclosure can be adjusted to account for a certain level of power density from a battery cell. For instance, if a battery cell has a very high power density, then additional liquid may be needed in the present disclosure for phase transition.

Figure 7:
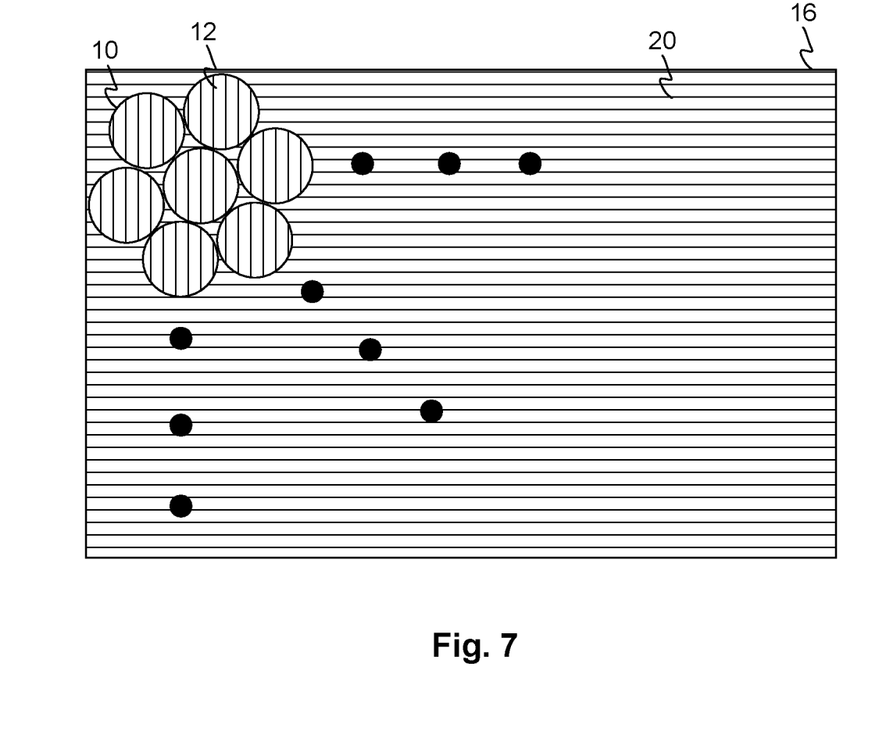
FIG. 7 illustrates a side view of a battery protection system.

FIG. 7 illustrates a side view of a battery protection system. The battery protection system (also referred to as a battery protection casing) can have a predefined number of sleeves 10 and battery cells 12 arranged within the case 16. The configuration can be based on various design factors such as the number of battery cells needed to be housed, the maximum amount of heat generated by each of the battery cells, the size of the case 16, the material of the battery cells, and other considerations. The case 16 can have a side wall 20 to enclose the inner cavity of the case 16. Thus, when looking from a side view of the battery protection system, the carbon fibers of each of the sleeves and the liquid within the inner cavity of the case 16 may not be visible from the exterior of the case.

It is important to note that the sleeves shown in the figures are cylindrical in shape. However, various shaped sleeves can be used in conjunction with the present disclosure. Thus, the present disclosure is not limited to any particular shaped sleeve, and is applicable for a range of shapes, including a curved panel, a flat panel, a rectangular shape, a hexagonal shape, or other polygonal shape. Other shaped sleeves can be used to implement the present disclosure as long as there are carbon fibers to serve as an interface between sleeves. Furthermore, the sleeves can comprise one or more of the following materials: an alloy, aluminum, stainless steel, copper, polymer coating, and/or combination thereof. The case can comprise one or more of the following materials: an alloy, aluminum, stainless steel, copper, polymer coating, and/or combination thereof.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred methods described herein but all those other and further alterations and modifications as would be apparent to those of ordinary skilled in the art.

We claim:

1. A battery protection system comprising:
   sleeves, wherein the sleeves are hollow for insertion of battery cells;
   carbon fibers, wherein the carbon fibers are disposed on outer surfaces of the sleeves;
   a case, wherein the case houses the sleeves and wherein the case has an inner cavity; and
   a liquid,
   wherein the liquid is disposed in the inner cavity,
   wherein the carbon fibers are exposed to the liquid in the inner cavity, and
   wherein the sleeves are interconnected by the carbon fibers.

2. The battery protection system of claim 1 wherein the liquid is able to traverse the carbon fibers via capillary attraction.

3. The battery protection system of claim 1 wherein the liquid wets the carbon fibers.

4. The battery protection system of claim 1 wherein the carbon fibers comprise a first group of carbon fibers having a first predefined length and a second group of carbon fibers having a second predefined length, and wherein the first predefined length is greater than the second predefined length.

5. The battery protection system of claim 1 wherein at least one of the battery cells is a lithium ion battery cell.

6. The battery protection system of claim 1 wherein the sleeves are cylindrical in shape.

7. The battery protection system of claim 1 wherein the sleeves comprise one or more of the following materials: an alloy, aluminum, stainless steel, copper, and polymer coating.

8. The battery protection system of claim 1 wherein the case comprises one or more of the following materials: an alloy, aluminum, stainless steel, copper, and polymer coating.

9. The battery protection system of claim 1 wherein the liquid is one or more of the following: water, alcohol, and vaporizing liquid.

10. The battery protection system of claim 1 wherein the case comprises a gas release valve for releasing gas vapor from the inner cavity to an exterior area of the case.

11. The battery protection system of claim 1 wherein adjacent ones of the sleeves are interconnected by carbon fibers at an interconnection, and wherein the carbon fibers at the interconnection form a flat interface area.

12. The battery protection system of claim 1 wherein certain ones of the carbon fibers are trimmed back to form a flat interface area for coupling to other carbon fibers.

13. The battery protection system of claim 1 wherein the sleeves are non-cylindrical shaped.

14. The battery protection system of claim 1 wherein lengths and densities of the carbon fibers and an amount of the liquid is selected as a function of a power density of the battery cells.

15. A battery protection casing for lithium ion battery cells, comprising:
    sleeves, wherein the sleeves are hollow for insertion of the lithium ion battery cells;
    carbon fibers, wherein the carbon fibers are disposed on outer surfaces of the sleeves;
    a case, wherein the case houses the sleeves and wherein the case has an inner cavity; and
    a liquid,
    wherein the liquid is disposed in the inner cavity,
    wherein the carbon fibers are exposed to the liquid in the inner cavity,
    wherein the sleeves are interconnected by the carbon fibers,
    wherein the liquid is able to traverse the carbon fibers via capillary attraction,
    wherein the carbon fibers comprise a first group of carbon fibers having a first predefined length and a second group of carbon fibers having a second predefined length, and
    wherein the first predefined length is greater than the second predefined length.

16. The battery protection casing of claim 15 wherein the liquid wets the carbon fibers, wherein the sleeves are cylindrical in shape, wherein the cylindrical sleeves comprise one or more of the following materials: an alloy, aluminum, stainless steel, copper, and polymer coating, wherein the case comprises one or more of the following materials: an alloy, aluminum, stainless steel, copper, and polymer coating, wherein the liquid is one or more of the following: water, alcohol, and vaporizing liquid, and wherein the case comprises a gas release valve for releasing gas vapor from the inner cavity to an exterior area of the case.

17. The battery protection casing of claim 15 wherein adjacent ones of the sleeves are interconnected by carbon fibers at an interconnection, and wherein the carbon fibers at the interconnection form a flat interface area.

18. The battery protection casing of claim 17 wherein certain ones of the carbon fibers are trimmed back to form the flat interface area for coupling to other carbon fibers.

19. The battery protection casing of claim 15 wherein lengths and densities of the carbon fibers and an amount of the liquid is selected as a function of a power density of the battery cells.

* * * * *